United States Patent
Koyanaka et al.

(10) Patent No.: US 9,295,975 B2
(45) Date of Patent: Mar. 29, 2016

(54) CATALYSTS REFORMING METHANE GASES INTO HYDROGEN AND METHODS FOR SYNTHESIZING THE SAME, AND METHODS FOR REFORMING METHANE GASES USING SAID CATALYSTS

(75) Inventors: Hideki Koyanaka, Kyoto (JP); Masahiko Tsujimoto, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 52 days.

(21) Appl. No.: 13/807,178

(22) PCT Filed: Jun. 24, 2011

(86) PCT No.: PCT/JP2011/064573
§ 371 (c)(1),
(2), (4) Date: Mar. 18, 2013

(87) PCT Pub. No.: WO2012/002283
PCT Pub. Date: Jan. 5, 2012

(65) Prior Publication Data
US 2013/0195750 A1    Aug. 1, 2013

(30) Foreign Application Priority Data
Jun. 28, 2010 (JP) .................. 2010-146157

(51) Int. Cl.
| | | |
|---|---|---|
| B01J 23/00 | (2006.01) |
| B01J 25/00 | (2006.01) |
| B01J 21/00 | (2006.01) |
| B01J 29/00 | (2006.01) |
| B01J 23/32 | (2006.01) |
| B01J 23/656 | (2006.01) |
| B01J 37/03 | (2006.01) |
| B01J 37/16 | (2006.01) |
| B01J 37/18 | (2006.01) |
| C01B 3/40 | (2006.01) |
| C01B 3/26 | (2006.01) |
| B01J 35/00 | (2006.01) |

(52) U.S. Cl.
CPC ............ B01J 23/6562 (2013.01); B01J 35/002 (2013.01); B01J 35/006 (2013.01); B01J 37/035 (2013.01); B01J 37/16 (2013.01); B01J 37/18 (2013.01); C01B 3/26 (2013.01); C01B 3/40 (2013.01); *C01B 2203/0233* (2013.01); *C01B 2203/1064* (2013.01); *C01B 2203/1241* (2013.01)

(58) Field of Classification Search
USPC .................. 423/605; 502/324, 100, 300, 325
See application file for complete search history.

(56) References Cited

U.S. PATENT DOCUMENTS

| | | | | |
|---|---|---|---|---|
| 4,402,869 A * | 9/1983 | Tauster | .................... | B01J 37/18 502/324 |
| 5,401,477 A * | 3/1995 | Cawlfield | ................. | C01G 9/02 423/50 |

(Continued)

OTHER PUBLICATIONS

Durmus et al., A green chemical route for the synthesis of Mn3O4 nanoparticles, 2009, Cent. Eur. J. Chem., 7(3), 555-559.*

*Primary Examiner* — James McDonough
(74) *Attorney, Agent, or Firm* — Wenderoth, Lind & Ponack, L.L.P.

(57) ABSTRACT

A method for synthesizing a catalyst which reforms a methane gas into a hydrogen gas efficiently at a relatively low temperature comprising a palladium deposition step in which a manganese dioxide having a ramsdellite-type crystal structure is immersed in a palladium-containing aqueous solution to allow the palladium to be deposited on the surface of said manganese dioxide, and a heat treatment step in which said manganese dioxide having the palladium deposited thereon is heated under a reducing atmosphere to change said manganese dioxide to a manganese oxide $Mn_3O_4$ having the palladium carried thereon.

4 Claims, 12 Drawing Sheets

(56) References Cited

U.S. PATENT DOCUMENTS

2003/0060655 A1* 3/2003 Hayashi .................. B01J 23/52 560/238

2005/0221977 A1* 10/2005 Fukunaga ................ B01J 21/04 502/324

2006/0280997 A1* 12/2006 Yoo ....................... H01M 4/926 502/326

* cited by examiner

CATALYSTS REFORMING METHANE GASES INTO HYDROGEN AND METHODS FOR SYNTHESIZING THE SAME, AND METHODS FOR REFORMING METHANE GASES USING SAID CATALYSTS

TECHNICAL FIELD

The present invention relates to a catalyst which reforms a methane gas to hydrogen and a method for synthesizing the same, as well as a method for reforming a methane gas using said catalyst.

BACKGROUND ART

Hydrogen is a representative clean energy, and it is no doubt that an inexpensive method for producing it will increasingly be required in the market. Currently, a major hydrogen producing method is a method in which a methane gas as a main ingredient of a natural gas is brought into contact with a steam at 700 to 800° C. whereby allowing it to be reformed into a hydrogen (steam reforming method). Nevertheless, this steam reforming method allows about 10 to 20% of the methane gas to remain as being unreformed, although it allows for a methane gas-to-hydrogen reforming rate as high as 80% or more. Accordingly, various attempts have been made in studies to reform the unreformed remaining methane gas to hydrogen by utilizing the residual heat of this steam reforming method. For example, Lodeng et. al. studied a catalytic method in which an alumina particle is allowed to carry a metal microparticle exerting a catalytic performance for reforming the methane gas such as a cobalt, nickel and iron, and the results of the study was published in 2007 (Non-Patent literature 1). However, the cobalt poses a problem due to its water solubility and the nickel and the iron suffer from a reduced catalytic performance due to a promoted oxidation, since a natural gas whose main ingredient is a methane gas which is gushed out of the underground actually contains, in addition to the steam, an erosive gas such as a hydrogen sulfide. Accordingly, when utilizing the nickel and the iron as reforming catalyst metals, every utilization requires a heating at several hundreds° C. while supplying hydrogen to reduce the oxidized nickel oxide and iron oxide for re-metallization, which poses a substantial problem with regard to the cost. Therefore, when considering an actual natural gas as a resource for the hydrogen gas production, it is a practical and critical problem how an extremely low-oxidizable noble metal catalyst such as a platinum and a palladium can be used at a low cost while maintaining the methane gas reforming performance. Moreover, a substance employed as a carrier for a noble metal catalyst microparticle is responsible not only for just carrying the noble metal catalyst microparticle. For example, when using an alumina as a carrier, the stability is ensured chemically and crystallographycally even at a temperature as high as 700° C., but a toxic carbon monoxide is produced as a by-product when reforming a methane gas to produce a hydrogen gas. Also when using as a carrier a carbon material such as an activated carbon, the carbon itself undergoes calcination with no resistance against a temperature of several hundred° C. if oxygen is mixed in the methane gas.

In view of the background described above, a technology enabling a hydrogen production by allowing a catalyst microparticle of a palladium, which is least expensive among the noble metals employed effectively in obtaining hydrogen by reforming a methane gas, to be carried on a carrier material which is heat resistant and does not produce carbon monoxide as a by-product is highly demanded. Accordingly, we proposed that a palladium catalyst microparticle is deposited chemically on the surface of a manganese dioxide having a ramsdellite-type crystal structure and used as a reformed catalyst (Patent Literature 1).

CITATION LIST

Patent Literatures

Patent Literatures 1: JP-A-2007-90342

Non-Patent Literatures

Non-Patent Literature 1: Lodeng, R, et. al., Catalytic partial oxidation of $CH_4$ to $H_2$ over cobalt catalysts at moderate temperatures, Applied Catalysis A:General 333, 11-23 (2007).

SUMMARY OF THE INVENTION

Problems to be Solved by the Invention

By employing the reforming catalyst reported in Patent Literature 1, several tens of ppm of hydrogen can be generated from a methane gas at a concentration of 99.9% at a reaction temperature of 190° C. However, for the purpose of producing hydrogen industrially from a methane gas, it is required to further improve the conversion efficiency.

Accordingly, an object of the invention, in view of the problems associated with the prior art, is to provide a catalyst which reforms a methane gas into a hydrogen gas efficiently at a relatively low temperature, and a method for synthesizing the same, as well as a method for reforming a methane gas which reforms the methane gas into a hydrogen gas.

Means for Solving the Problems

The present invention is characterized by the followings.

Thus, the method for synthesizing a methane gas reforming catalyst according to the invention is a method for synthesizing a catalyst which reforms a methane gas into a hydrogen gas comprising a palladium deposition step in which a manganese dioxide having a ramsdellite-type crystal structure is immersed in a palladium-containing aqueous solution to allow the palladium to be deposited on the surface of said manganese dioxide, and a heat treatment step in which said manganese dioxide having the palladium deposited thereon is heated under a reducing atmosphere to change said manganese dioxide to a manganese oxide $Mn_3O_4$ having the palladium carried thereon.

In this method for synthesizing a methane gas reforming catalyst, it is preferable that said heat treatment step involves heating said manganese dioxide having the palladium deposited thereon in a reducing atmosphere of a gas mixture of a methane gas and an argon gas, a gas mixture of a hydrogen gas and an argon gas, or a gas mixture of a hydrogen gas and a nitrogen gas.

In this method for synthesizing a methane gas reforming catalyst, it is preferable that said heat treatment step involves heating said manganese dioxide having the palladium deposited thereon in a reducing atmosphere at a temperature of 150° C. to 700° C.

In this method for synthesizing a methane gas reforming catalyst, it is preferable that said manganese dioxide having a ramsdellite-type crystal structures employed in said palladium deposition step is obtained by adding to an aqueous solution of a manganese compound comprising a divalent manganese ion an alkali reagent to precipitate a manganese hydroxide, further adding an aqueous hydrogen peroxide to convert said manganese hydroxide to a manganese oxide, followed by recovering this manganese oxide which is then brought into contact with a dilute acid.

Furthermore, the methane gas reforming catalyst according to the invention is a catalyst which is synthesized by any of the aforementioned methods and reforms a methane gas into a hydrogen gas wherein a palladium is carried on a manganese oxide $Mn_3O_4$.

In this methane gas reforming catalyst, it is preferable that the particle size of the palladium carried on the manganese oxide $Mn_3O_4$ is 10 nm or less.

Furthermore, the method for reforming a methane gas according to the invention comprises bringing a methane gas into contact with the methane gas reforming catalyst synthesized by any of the aforementioned methods in an atmosphere of a temperature of 200° C. or higher.

In this method for reforming a methane gas, it is preferable that said methane gas is brought into contact with said methane gas reforming catalyst in a humidified atmosphere.

In this method for reforming a methane gas, it is preferable that said methane gas is brought into contact with said methane gas reforming catalyst in an atmosphere comprising substantially no oxygen.

Also in this method for reforming a methane gas, it is preferable that said methane gas is brought into contact with said methane gas reforming catalyst at a temperature of 300 to 600° C.

Advantageous Effects of the Invention

According to the present invention, a catalyst capable of reforming a methane gas into a hydrogen gas efficiently at a relatively low temperature can be synthesized.

MODES FOR CARRYING OUT THE INVENTION

Figure 1:
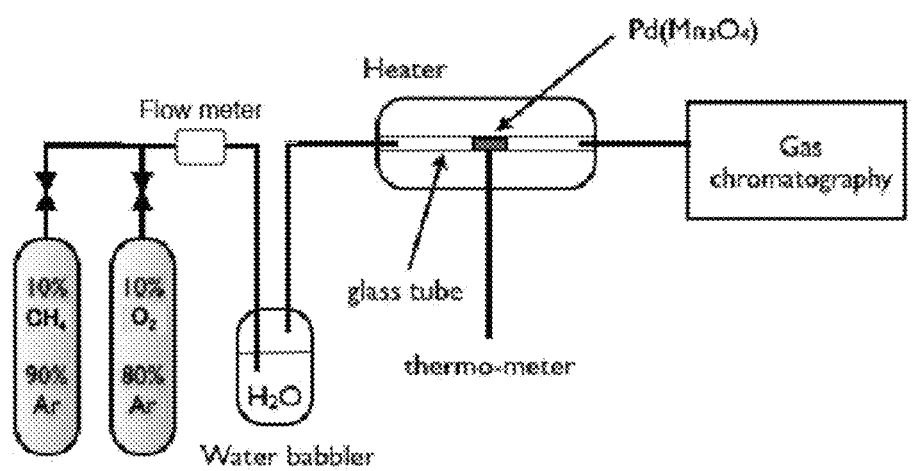
FIG. 1 shows a schematic view of an experimental system employed for synthesizing $Pd(Mn_3O_4)$ and reforming a methane gas into hydrogen using $Pd(Mn_3O_4)$ in Examples.

The embodiments of the present invention are described below.

A catalyst $Pd(Mn_3O_4)$, which reforms a methane gas into a hydrogen gas, comprises a carrier consisting of a manganese oxide $Mn_3O_4$ on which a palladium (Pd) is carried. This manganese oxide $Mn_3O_4$ is synthesized by the method described below.

Thus, a manganese dioxide having a ramsdellite-type crystal structure (hereinafter sometimes referred to as a ramsdellite-type manganese dioxide) is immersed in a palladium-containing aqueous solution to allow the palladium to be deposited on the surface of the ramsdellite-type manganese dioxide (palladium deposition step). Then, the ramsdellite-type manganese dioxide having the palladium deposited thereon is heated under a reducing atmosphere to change said manganese dioxide to a manganese oxide $Mn_3O_4$ (heat treatment step). As a result, a methane gas reforming catalyst $Pd(Mn_3O_4)$ is obtained.

The palladium deposition step is described below.

First, an aqueous solution containing a metal palladium Pd such as palladium hydroxide $Pd(OH)_2$ (hereinafter sometimes referred to as an aqueous solution of the palladium) is provided. It is preferable herein that the aqueous solution of the palladium contains the palladium at a concentration of 1000 ppm to 10000 ppm. It is also preferable that the pH is adjusted at 4.8 or higher and 10 or lower. Then, to this aqueous solution of the palladium the ramsdellite-type manganese dioxide is added and suspended. Upon this, an alkali reagent such as an aqueous solution of sodium hydroxide is added dropwise while stirring the aqueous solution of the palladium to ensure that the pH 4.8 or higher is kept for about 24 hours. Finally, the palladium is deposited chemically on the surface of the ramsdellite-type manganese dioxide to give $Pd(MnO_2)$. The precipitated metal palladium is a nanoparticle whose particle size (diameter) is 10 nm or less, particularly 0.1 nm to 5 nm, especially about 1 nm to 5 nm.

In this palladium deposition step, it is possible to subject the ramsdellite-type manganese dioxide preliminarily to a drying treatment at about 130° C. followed by suspending this ramsdellite-type manganese dioxide in the aqueous solution of the palladium. It is also possible that the ramsdellite-type manganese dioxide which has been immersed in a distilled water is recovered by filtration and suspended in the aqueous solution of the palladium.

The reaction yielding the palladium deposited on the surface of the ramsdellite-type manganese dioxide is represented by the following reaction scheme.

First Anode Reaction:

$$OH^- + 2Mn(IV)O_{2(surface)} \rightarrow H\,Mn(III)_2O_4^-{}_{(surface)} + 1/2\,O_2$$

Second Anode Reaction:

$$H\,Mn(III)_2O_{4(surface)}^- \rightarrow 2Mn(IV)O_{2(surface)} + 2e^- + H^+$$

Cathode Reaction:

$$Pd^{2+} + 2e^- \rightarrow Pd$$

Overall Reaction:

$$Pd^{2+} + OH^- \rightarrow Pd + 1/2\,O_2 + H^+$$

The manganese $Pd(MnO_2)$ having the palladium deposited on its surface and having a ramsdellite-type crystal structure is recovered by filtration of the aqueous solution of the palladium in which the ramsdellite-type manganese dioxide is suspended. After recovery, $Pd(MnO_2)$ may be dried in atmosphere at about 130° C.

In this palladium deposition step, the ramsdellite-type manganese dioxide to be suspended in the aqueous solution of the palladium can be synthesized according to the following steps.

First, an aqueous solution of a manganese compound containing a highly water-soluble divalent manganese ion such as manganese chloride and manganese sulfate is prepared, and to this aqueous solution an alkali reagent such as sodium hydroxide is added to convert the manganese ion into manganese hydroxide $Mn(OH)_2$. This procedure is referred to as Step 1. The aqueous solution of the manganese compound containing a divalent manganese may for example be an aqueous solution whose manganese ion concentration is 0.05 to 1.0% by weight, preferably 0.08 to 0.2% by weight. Next, in Step 2, to the aqueous solution of the divalent manganese compound to which the alkali reagent was added, an aqueous hydrogen peroxide is added to convert the manganese hydroxide into a manganese oxide $Mn_3O_4$ having a manganese valency of 2.67. Finally in Step 3, to the manganese oxide $Mn_3O_4$, a dilute acid (the dilute acid means a solution of an acid such as hydrochloric acid, sulfuric acid and nitric acid at a low concentration such as an aqueous solution of an acid at a concentration of 0.1 M to 1 M.) is added and stirred to synthesize a nano-manganese dioxide having a ramsdellite-type crystal structure. As used herein, the nano-manganese dioxide means a nanoparticle of the manganese dioxide, and the nanoparticle means a particle having a nanometer-order size, such as a particle having a diameter (particle size) of 1 to 100 nm. The nano-manganese dioxide having a ramsdellite-type crystal structure has a shape such as rod, needle and the like.

It is important to kept the temperature of the water in the synthesis at 25° C. or lower especially in Step 2 among the synthetic steps of the aforementioned ramsdellite-type manganese dioxide for the purpose of finally obtaining the ramsdellite-type manganese dioxide.

Also after completion of Step 3, the nano-manganese dioxide having a ramsdellite-type crystal structure may be immersed in an aqueous solution containing a divalent manganese ion to promote the crystal growth of the nano-manganese dioxide. This treatment is hereinafter referred to also as a crystal growth treatment. It is effective here for promoting the crystal growth that the aqueous solution has a high acidity, such as a pH less than 3, typically pH1. The effect becomes remarkable especially when using a sulfuric acid. Also for achieving the crystal growth of the nano-manganese dioxide, the duration of the heating for promoting the ramsdellite-type crystal growth is preferably 100 hours or less, particularly 10 to 80 hours, especially about 60 hours, since the heating of the aforementioned aqueous solution for a prolonged period (such as a duration exceeding 100 hours) results in a mixed crystal of the finally obtained crystal of ramsdellite-type structure containing manganese oxides having other crystal structures. The temperature at which the aforementioned aqueous solution is heated may for example be 50° C. or hither, preferably 80° C. or higher, more preferably 90° C. or higher.

The crystal structure and the size of the ramsdellite-type manganese dioxide in the embodiments of the present invention can be identified for example by analyzing the X ray diffraction pattern using an ordinary laboratory X ray diffraction analyzer.

The heat treatment step is described below.

In the heat treatment step, the $Pd(MnO_2)$ is heated in a reducing atmosphere to convert the manganese dioxide into a manganese oxide $Mn_3O_4$.

The heat treatment is conducted for example by the device shown in FIG. 1. In the device shown in FIG. 1, a Pyrex (trade mark) glass tube contains $Pd(MnO_2)$ as being compacted therein. The glass tube is heated by a heater. This glass tube is connected to a gas cylinder for supplying a gas into the glass tube and a flowmeter, and a bubbler containing a distilled water is provided between the glass tube and the gas cylinder. Also to the glass tube, a gas chromatograph is connected for quantifying the concentration of the gas produced. The heat treatment is conducted by supplying the gas mixture described below into the glass tube to establish a reducing atmosphere and heating the $Pd(MnO_2)$ in the glass tube using a heater.

The reducing atmosphere may for example be a gas mixture of a methane gas and an argon gas, a gas mixture of a hydrogen gas and an argon gas, or a gas mixture of a hydrogen gas and a nitrogen gas. In the case of a gas mixture of a methane gas and an argon gas, when the methane gas concentration is 10% and the argon gas concentration is 90%, then the flow rate ratio (methane gas/argon gas) is preferably about 1/20 to 1/4. A ratio preferred particularly is 1/10 to 1/5, especially 1/9. In the case of a gas mixture of a hydrogen gas and an argon gas or a gas mixture of a hydrogen gas and a nitrogen, then the hydrogen gas concentration is preferably about 1 to 10%.

The temperature of the heat treatment may for example be 150° C. or higher and 700° C. or lower, preferably 180° C. or higher and 600° C. or lower, especially about 300° C. By heating the $Pd(MnO_2)$ at a temperature within this range, the manganese dioxide carrying the palladium can effectively be converted into a manganese oxide $Mn_3O_4$.

The catalyst $Pd(Mn_3O_4)$ thus synthesized is excellent in the heat resistance. Also, it can convert a methane gas into a hydrogen gas efficiently at a relatively low temperature.

The generation of the hydrogen from the methane gas can be conducted by the device shown in FIG. 1. For example the methane gas is supplied from the gas cylinder into the glass tube and brought into contact with the catalyst $Pd(Mn_3O_4)$ and then heated by the heater at a temperature of 200° C. or higher to generate the hydrogen. The concentration of the methane gas to be brought into contact with the catalyst $Pd(Mn_3O_4)$ may for example be 1 to 99.9%.

In this hydrogen generation, it is preferable to bring the methane gas into contact with the catalyst $Pd(Mn_3O_4)$ in a humidified (moisturized) atmosphere. The degree of the humidification (moisturization) may for example be 70% RH or higher, preferably 80% RH or higher. In the device shown in FIG. 1, to obtain a humidified (moisturized) atmosphere, the methane gas is allowed to pass through a bubbler containing a distilled water. As a result, the methane gas is moisturized and the methane gas in the glass tube is allowed to contain water. The reasons for employing such a humidified (moisturized) atmosphere are the effectiveness in reacting the carbon monoxide with the water and the manganese oxide to effect the decomposition into a hydrogen ion and an electron.

Also in this hydrogen generation, it is preferable that the methane gas is brought into contact with the reforming catalyst $Pd(Mn_3O_4)$ in an atmosphere containing substantially no oxygen. As used herein, the phrase "containing substantially no oxygen" means that the concentration of the oxygen in the reaction system is low sufficiently to exhibit no reduction in the reforming of the methane gas due to the promotion of the methane gas combustion by the oxygen serving as a combustion aid. Typically, it means a state where the concentration of the oxygen in the reaction system is 100 ppm or lower, especially 20 ppm or lower. As a result of the contact of the methane gas with the catalyst $Pd(Mn_3O_4)$ in the atmosphere containing substantially no oxygen, the methane gas is reformed into hydrogen effectively.

While in this hydrogen generation the methane gas is brought into contact with the catalyst $Pd(Mn_3O_4)$ in the atmosphere at a temperature of 200° C. or higher, the temperature is preferably 300° C. to 600° C., especially about 300° C. A temperature exceeding 600° C. poses a increased cost, which may prevent an inexpensive hydrogen production. It may also reduce the methane gas reforming effect due to a deterioration of the catalyst $Pd(Mn_3O_4)$.

Thus, the methane gas reforming method employing the catalyst $Pd(Mn_3O_4)$ enables the reformation at a relatively low temperature such as a temperature of 200° C. or higher and 600° C. or lower when compared with a conventional steam reformation of the methane gas which employed a steam at about 700 to 800° C., thereby allowing a hydrogen production at a low cost. In addition, the hydrogen conversion efficiency is high. For example, it was confirmed that the hydrogen concentration when the catalyst $Pd(Mn_3O_4)$ is employed to reform the methane gas at 300° C. is 700 times the hydrogen concentration when a catalyst $Pd(MnO_2)$ is employed at 200° C. The methane gas reforming method employing the catalyst $Pd(Mn_3O_4)$ is advantageous also because of no formation of carbon monoxide as a by-product.

The following Examples are presented for a further detailed description. It is a matter of course that the following examples do not restrict the invention.

EXAMPLES

Example 1

Methane Gas Reforming Catalyst $Pd(Mn_3O_4)$ Synthesis Method (1-1) Method for Synthesizing Ramsdellite-Type Manganese Dioxide $MnO_2$ Having Ramsdellite-Type Crystal Structure Serving as Initial Carrier for Palladium Catalyst Metal Microparticle
(1-1-1) Method for Synthesizing Manganese Oxide $Mn_3O_4$ and Ramsdellite-Type Manganese Dioxide $MnO_2$ by Hydrothermal Synthesis Using Manganese Chloride as Starting Material Using a manganese chloride as a starting material, the following 3 steps were conducted to synthesize an ramsdellite-type manganese dioxide nanoparticle by a hydrothermal synthesis. 26.7 g of a manganese chloride $MnCl_2.4H_2O$ (99%, special grade reagent from Wako Pure Chemical Industries, Ltd.) as a starting material was dissolved in 225 ml of an ion exchange water in a beaker.

In Step 1, this aqueous solution of the manganese chloride (pH4.6) was combined with 90 mL of the ion exchange water in which 10.8 g of a sodium hydroxide NaOH (99%, special grade reagent from Wako Pure Chemical Industries, Ltd.) was dissolved, and stirred using a magnetic stirrer. The manganese chloride changed immediately upon this sodium hydroxide addition into an opaque compound (manganese hydroxide $Mn(OH)_2$). The pH at this time was about 12.

Thereafter in Step 2, 54 mL of an aqueous hydrogen peroxide (30% from Wako Pure Chemical Industries, Ltd.) was added dropwise and the stirring was continued, and the opaque compound was changed into a brown tan compound. At this time, by cooling the circumference of the beaker as a reaction container using an ice water the heat generation due to the hydrogen peroxide addition was suppressed, and the temperature of the reaction solution containing the brown tan compound was kept at 25° C. or lower. The final pH of the reaction solution was about 7.5. After this procedure, the brown tan compound in the reaction solution was subjected to filtering with a 0.2 μm mesh-sized glass filter paper (Advantec Co., Ltd., GS-25) and a filter under reduced pressure thereby recovering the brown tan compound on the glass filter paper. The compound thus recovered on the filter paper was suspended in 500 mL of the ion exchanged pure water and stirred for 1 hour using a Teflon (Trade Mark) magnetic stirrer for washing to obtain Sample A.

Thereafter in Step 3, Sample A was suspended in 1 L of a dilute hydrochloric acid at a concentration of 0.5 M and stirred for 8 hours, and then recovered by filtration, and washed for 1 hour in 500 mL of the ion exchanged pure water to obtain Sample B.

Furthermore after completion of Step 3, a crystal growth treatment was conducted in which a suitable amount of this Sample B was suspended in 100 mL of a solution obtained by dissolving 18 g of a manganese chloride in 500 mL of a dilute hydrochloric acid at a concentration of 0.5 M and placed in a 100-mL conical flask having a closure, which was kept at 90° C. for 12 hours as being closed tightly. Thereafter, the conical flask was allowed to cool to room temperature, and Sample B was recovered by filtration, washed by stirring for 1 hour in 1 L of the ion exchanged pure water, and then dried for 12 hours at 110° C. under atmospheric pressure to obtain Sample C.

Figure 2:
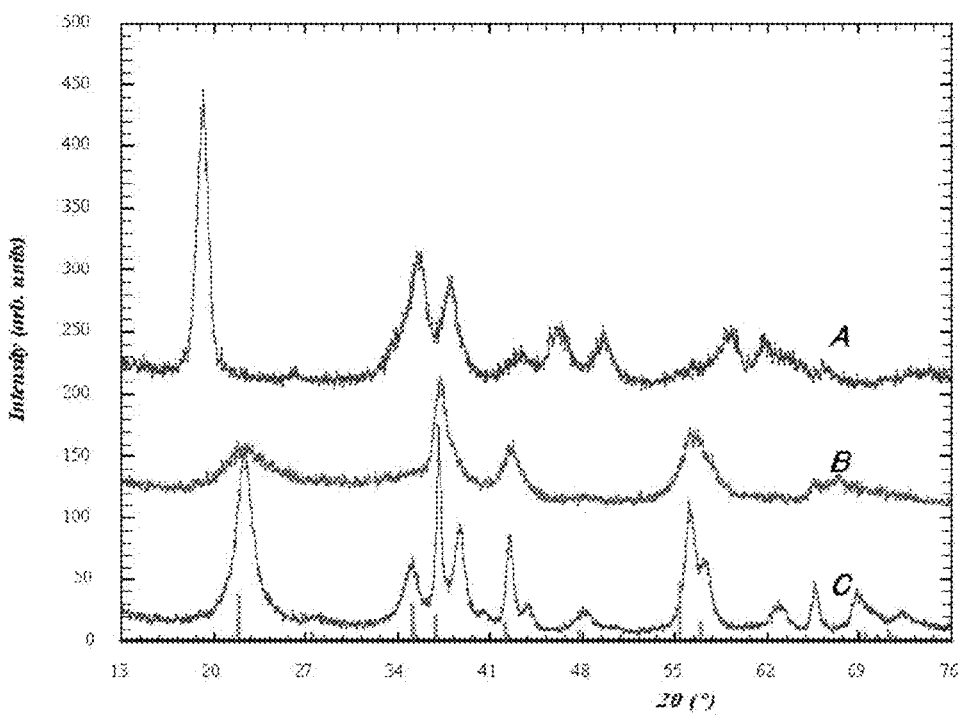
FIG. 2 shows the X ray diffraction patterns of samples A, B and C which were obtained in Synthetic Steps 2, 3 and by a crystal growth treatment after completion of Synthetic Step 3 in Examples.
Figure 3:
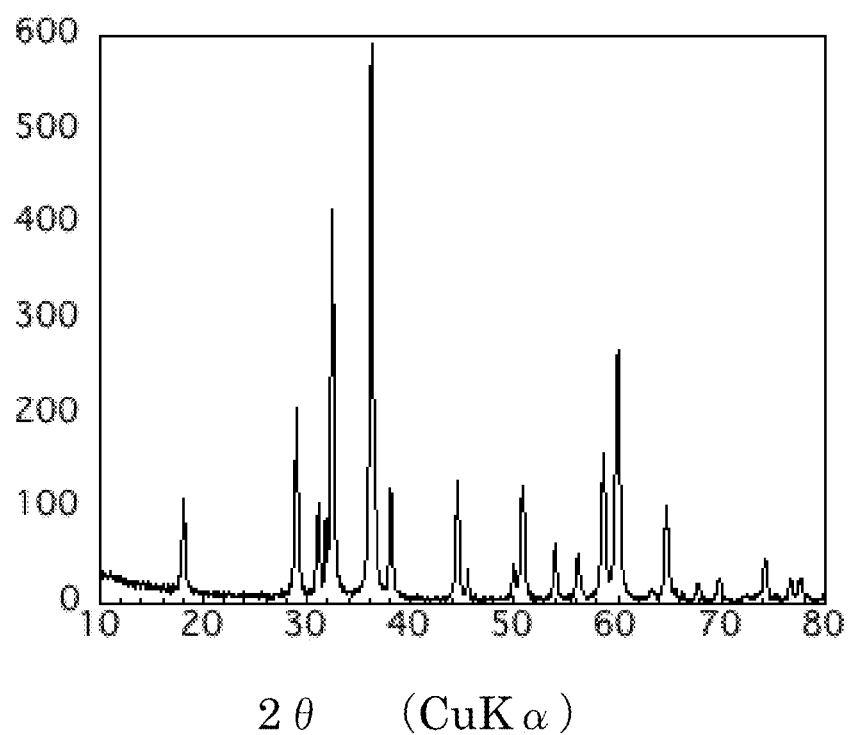
FIG. 3 shows an X ray diffraction pattern after drying Sample A at 200° C. for 2 hours in Examples.

FIG. 2 shows the results of the analysis of the crystal structure using a powder X-ray diffraction analyzer (Rigaku Corporation, Model RINT-2000, CuKα). As a result, it was confirmed that Sample A obtained in Step 2 was a manganese oxide $Mn_3O_4$. While this Sample A has a broad X ray diffraction pattern in FIG. 2 because of being humidified with water, by drying this humidified Sample A in an atmosphere at 200° C. for 2 hours, a defined peak of the manganese oxide $Mn_3O_4$ was observed as shown in FIG. 3. While the pattern of Sample B obtained in Step 3 showed broad peaks because of which the identification of the crystal structure was difficult, it was proven that a manganese dioxide having a ramsdellite-type structure was obtained by this hydrothermal synthesis, since the pattern of Sample C obtained by keeping Sample C at 90° C. in the dilute hydrochloric acid after completion of Step 3 was in agreement with the ramsdellite-type crystal structure peaks shown on the abscissa of FIG. 2.

Figure 4:
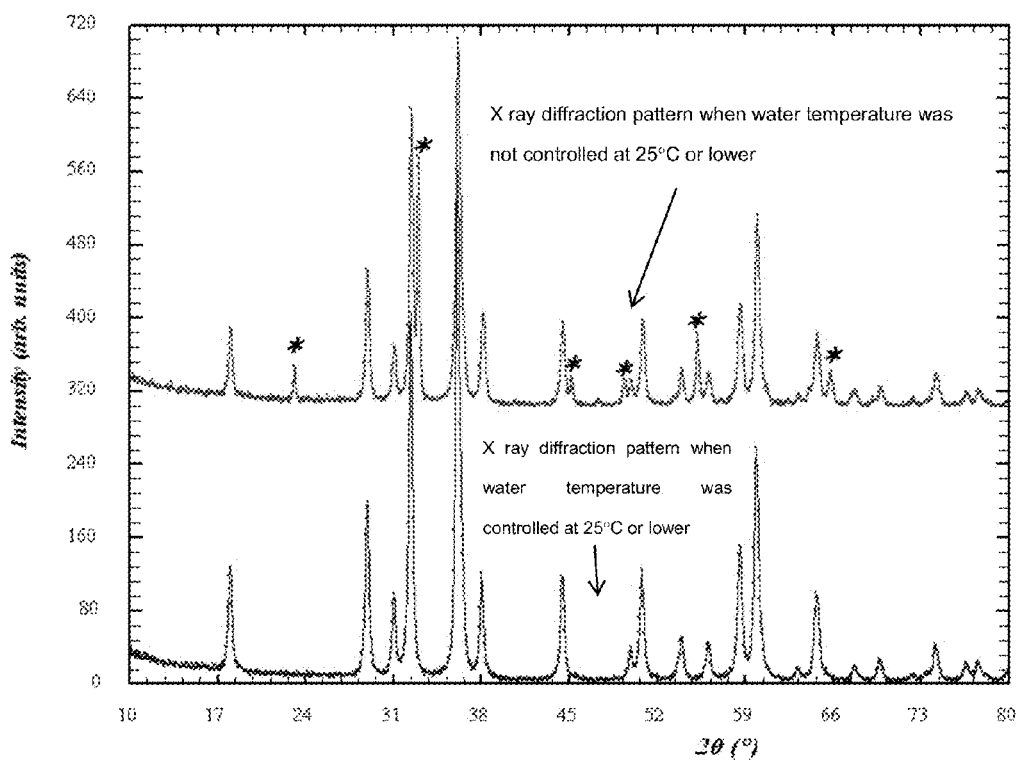
FIG. 4 shows X ray diffraction patterns of the samples obtained with (bottom) or without (top) controlling the temperature of the water at 25° C. or lower in Synthetic Step 2 in Examples.

In Step 2 described above, when the synthesis was continued at 30° C. or higher without controlling the water temperature at 25° C. or lower, the peaks marked with *, which reflected the existence of a manganese oxide $Mn_2O_3$ of another species, appeared as being mixed with the peaks of $Mn_3O_4$. When controlling the water temperature at 25° C. or lower (pattern on bottom of FIG. 4), only the peaks of $Mn_3O_4$ were observed, and there is no adverse effect on the purity of the manganese dioxide having a ramsdellite-type structure obtained in the subsequent Step 3.

Figure 5:
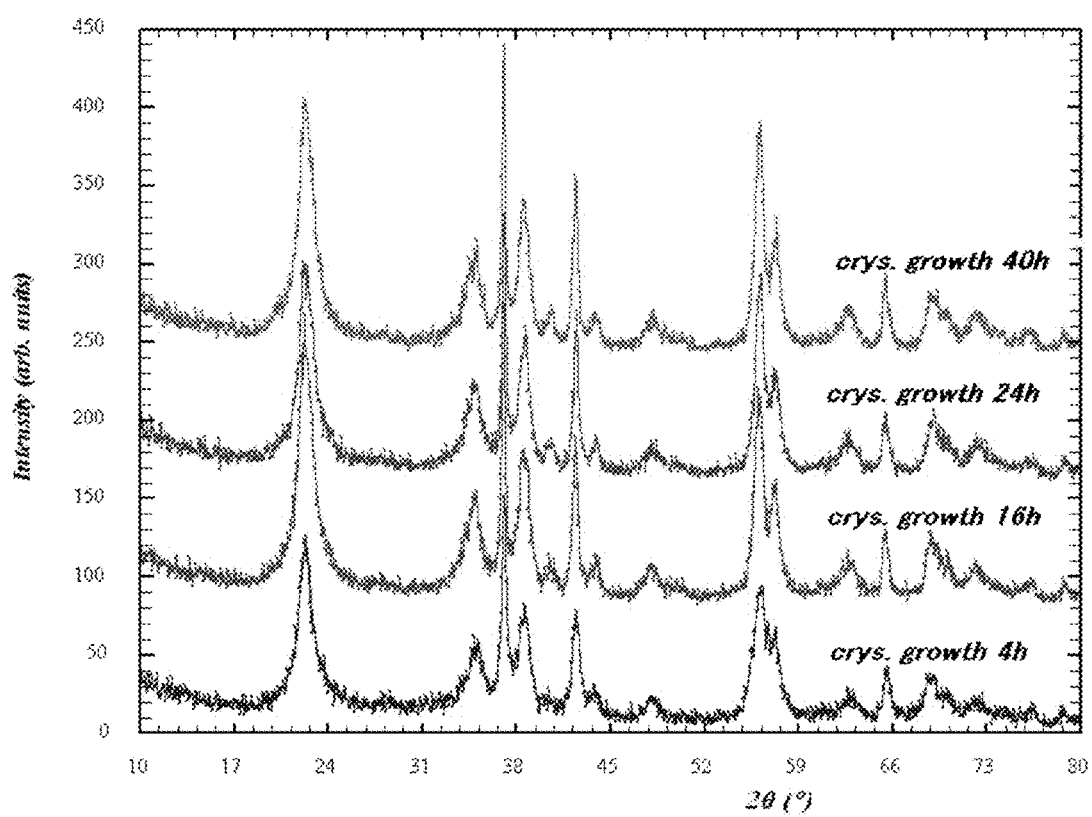
FIG. 5 shows an X ray diffraction pattern of the sample obtained when the 90° C.-heating time period is changed from 4 to 40 hours in the crystal growth treatment after completion of Synthetic Step 3 in Examples.
Figure 6:
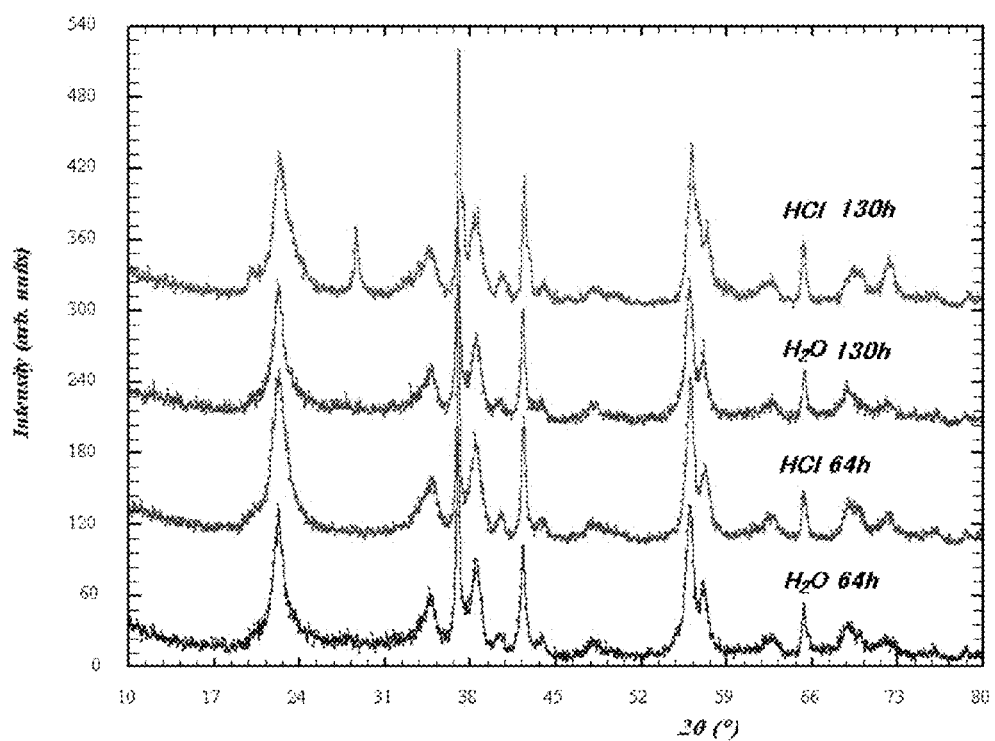
FIG. 6 shows X ray diffraction patterns of the samples obtained using a manganese chloride as a starting material and using water or a dilute hydrochloric acid in Synthetic Step 3 and the crystal growth treatment in Examples.

Also in FIG. 5, the effects of the heating time during the crystal growth treatment after completion of the synthesis Step 3 on the crystal growth and the purity of the manganese dioxide having a ramsdellite-type structure obtained finally are indicated. This figure shows the X-ray diffraction pattern obtained by heating the dilute hydrochloric acid for 4 hours, 16 hours, 24 hours and 40 hours at 90° C. instead of keeping the dilute hydrochloric acid for 12 hours at 90° C. during the aforementioned crystal growth treatment. The crystal is grown along with the increased time period of the heating. When heating for 16 hours, 24 hours and 40 hours, the crystal was grown slightly when compared with Sample C in FIG. 2, as reflected by the respective peak intensities and the peak sharpness in the X-ray diffraction pattern. Nevertheless, as shown in FIG. 6, when the dilute hydrochloric acid was used in the crystal growth treatment with heating at 90° C. for 130 hours (pattern on top of figure), there were peaks between 24° to 31° which were not observed with a ramsdellite type. Thus, it was found that the heating treatment for a period exceeding 100 hours had an adverse effect on the purity of the ramsdellite-type manganese dioxide obtained finally. FIG. 6 also shows the X-ray diffraction patterns obtained when the crystal growth treatment was conducted employing the dilute hydrochloric acid with heating at 90° C. for 64 hours and employing the water with heating at 90° C. for 130 hours and 64 hours. Based on the results shown in FIG. 5 and FIG. 6, the heating time period which is optimum for promoting the crystal growth under this condition is less than 100 hours.

(1-1-2) Method for Synthesizing Manganese Oxide $Mn_3O_4$ and Ramsdellite-Type Manganese Dioxide Nanoparticle by Hydrothermal Synthesis Using Manganese Sulfate as Starting Material 32.51 g of a manganese sulfate $MnSO_4.5H_2O$ (99%, special grade reagent from Wako Pure Chemical Industries, Ltd.) employed as a starting material instead of the manganese chloride in the experiment (1-1-1) described above was dissolved in 225 mL of the ion exchange pure water in a beaker. The subsequent treatments and the amounts of the reagents in respective steps were similar to those in Example 1, except for using a dilute sulfuric acid at a concentration of 0.25 M during the acid treatment in Step 3. Finally, the compound obtained after completion of Step 3 was recovered by filtration and 1.6 g aliquots were dispensed into 3 volumetric flasks having closures and suspended in 100 mL of the ion exchange pure water in which the manganese sulfate was dissolved at a manganese ion concentration of 0.1% by weight, and kept under this condition at 90° C. for 48 hours, thereby promoting the crystal growth. Here the pHs of the suspensions in the respective volumetric flasks having closures were adjusted to 5.2, 3 and 1. This adjustment employed the sulfuric acid. Thereafter, the temperature was allowed to be lowered to room temperature, and then the compound was recovered by filtration and the X-ray diffraction pattern was measured. The results are shown in FIG. 7.

Figure 7:
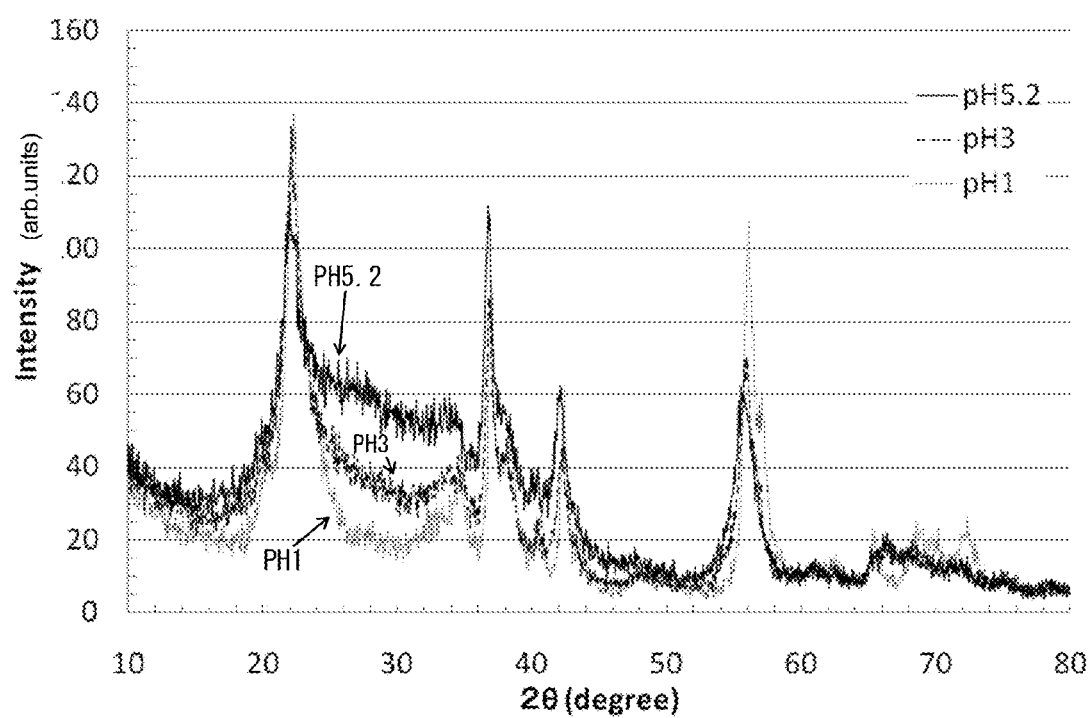
FIG. 7 shows X ray diffraction patterns of the samples obtained using a manganese sulfate as a starting material and using water or a dilute sulfuric acid in Synthetic Step 3 and the crystal growth treatment in Examples.

Based on FIG. 7, it was confirmed that the compound obtained by adjusting the pH to 1 had a higher peak intensity and sharpness when compared with the compounds obtained by adjusting the pH to 5.2 and 3. Accordingly, it was revealed that for the ramsdellite-type manganese dioxide crystal growth when using the sulfuric acid it is effective to conduct the heating in a manganese ion aqueous solution which was as highly acidic as pH1.

(1-2) Method for Synthesizing Manganese Oxide $Pd(Mn_3O_4)$ Carrying Palladium Catalyst Metal Microparticle from Ramsdellite-Type Manganese Dioxide $MnO_2$ having Ramsdellite-Type Crystal Structure Carrying Palladium Catalyst Metal Microparticle Each of the manganese dioxides having ramsdellite-type crystal structures obtained by the techniques of (1-1-1) and (1-1-2) described above was suspended in an aqueous solution containing the palladium at a concentration of 1000 ppm or 10000 ppm and stirred for 24 hours.

Figure 8:
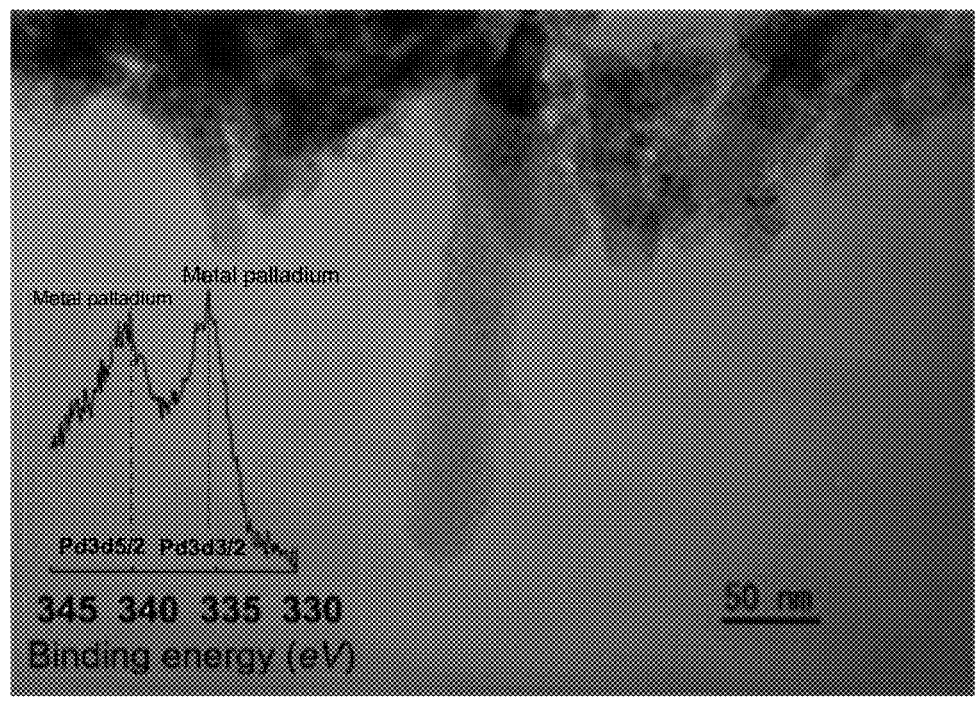
FIG. 8 shows a transmission electron microscopic photograph of the $Pd(MnO_2)$ obtained by allowing a palladium catalyst microparticle to undergo a metal deposition chemically on a manganese dioxide having a ramsdellite-type crystal structure in Examples.

At this stage, the ramsdellite-type manganese dioxide to be suspended in the aqueous solution of the palladium may preliminarily be subjected to a drying treatment at about 130° C. followed by suspending in the aqueous solution of the palladium, or, alternatively, one which has been immersed in a distilled water may be recovered by filtration and suspended in the aqueous solution of the palladium. Then, a 0.1 mol/L aqueous solution of sodium hydroxide was added dropwise to keep the pH of this suspension at 6 to 7. The suspension was filtrated after 24 hours to effect a solid/liquid separation, and a paste-like solid recovered on the filter paper was dried for 24 hours at 130° C. in an atmosphere using a drying machine. As a result of these procedures, it was possible to synthesize the $Pd(MnO_2)$ having the palladium catalyst microparticle metal deposited as shown in the transmission electron microscopic photograph in FIG. 8.

Figure 9:
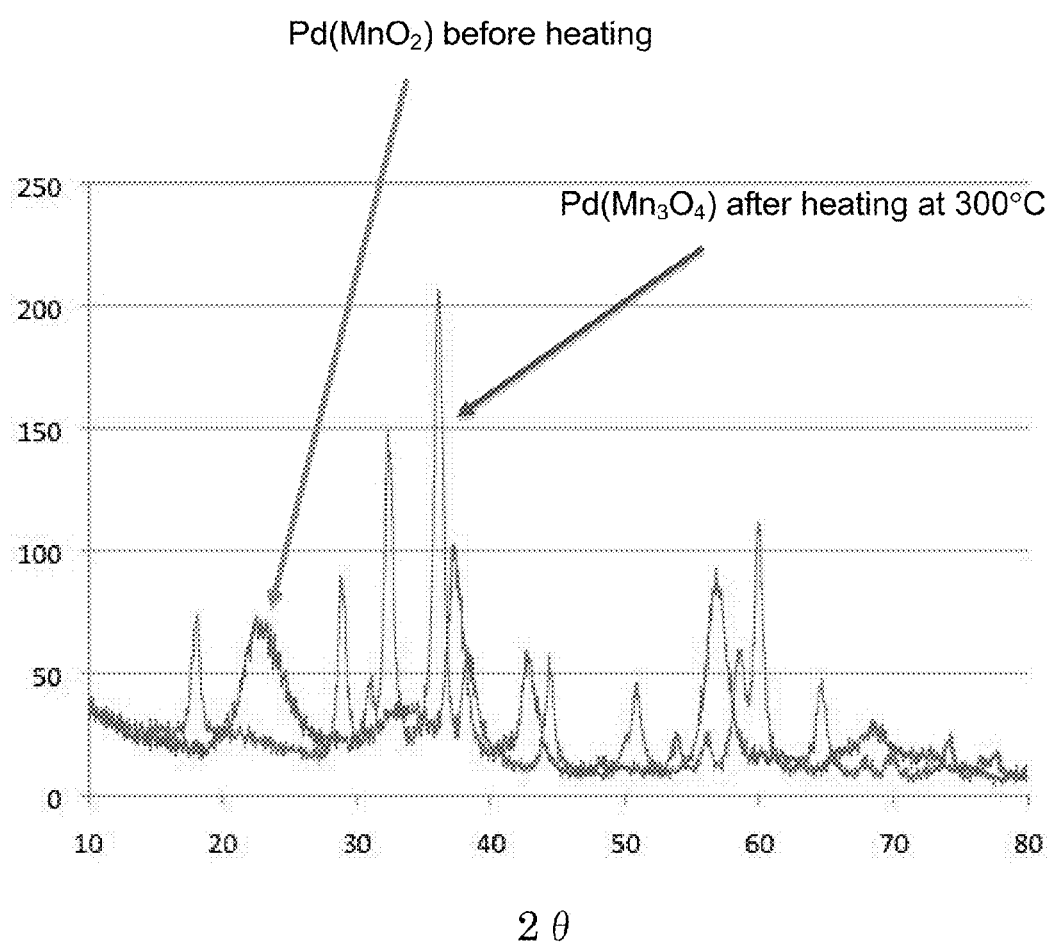
FIG. 9 shows an X ray diffraction pattern of $Pd(Mn_3O_4)$ obtained by keeping $Pd(MnO_2)$, obtained by allowing a palladium catalyst microparticle to undergo a metal deposition chemically on a manganese dioxide having a ramsdellite-type crystal structure, in a gas mixture atmosphere of a methane gas at a concentration of 10% and an argon gas at a concentration of 90% for 4 hours at 300° C. in Examples.

Then, in the reaction system shown in FIG. 1, 0.2 g of $Pd(MnO_2)$ was packed into the Pyrex (trade mark) glass tube of 6 mm in inner diameter. The $Pd(MnO_2)$ in this glass tube was heated to 300° C. using a heater, and this temperature was kept while the gas mixture of a methane gas (10% concentration) and an argon gas (90% concentration) humidified by the passage through a bubbler filled with 30 mL of a distilled water was introduced continuously at a flow rate of 20 mL/min, thereby heating for 4 hours. As a result of this heating, the crystal structure and the composition of the manganese dioxide having a ramsdellite-type crystal structure as a carrier for the palladium metal catalyst microparticle were changed to those of a manganese oxide $Mn_3O_4$. FIG. 9 shows this change as a result of the measurement of the X ray diffraction patterns before and after heating at 300° C. for comparison and confirmation. The X ray diffraction pattern after the heating shows the pattern assigned mainly to the manganese oxide $Mn_3O_4$, showing a marked change from the pattern assigned to a ramsdellite-type manganese dioxide. Since this heat treatment allows the methane gas to be introduced and subjected to the palladium's catalytic effect thereby generating hydrogen, the hydrogen thus generated is considered to serve for reducing the palladium hydroxide $Pd(OH)_2$ remaining in a small amount on the surface of the $Pd(MnO_2)$ also to the metal palladium.

Figure 10:
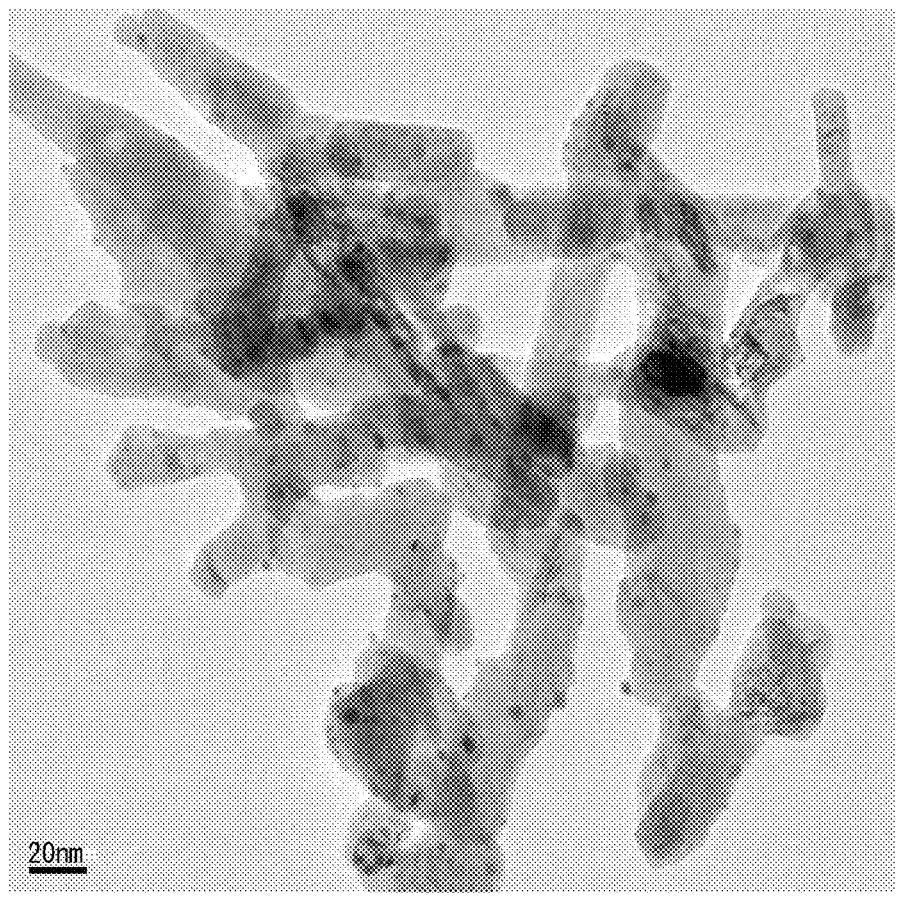
FIG. 10 shows a transmission electron microscopic photograph of $Pd(Mn_3O_4)$.
Figure 11:
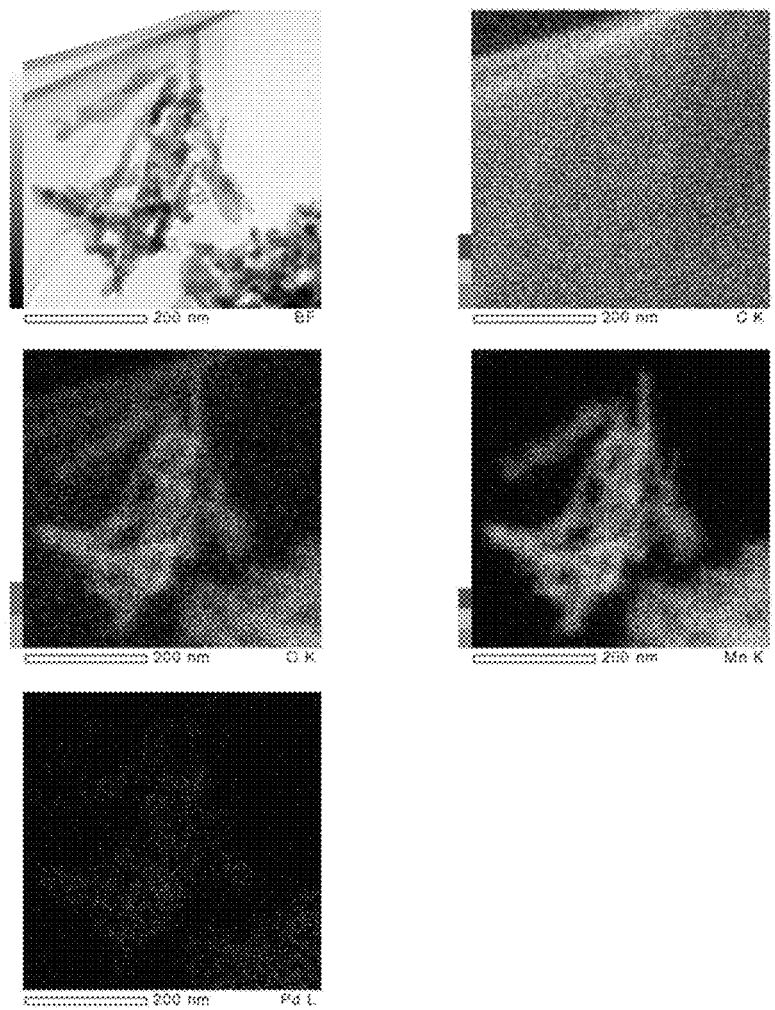
FIG. 11 shows an example of the measurement of $Pd(Mn_3O_4)$ using the element mapping system attached to the transmission electron microscopic photograph.

FIG. 10 shows a transmission electron microscopic photograph of $Pd(Mn_3O_4)$ obtained by heating $Pd(MnO_2)$ in the glass tube at 300° C. From FIG. 10, it can be seen that the rods of $Mn_3O_4$ are aggregated and on the surfaces of these rods the Pd metal catalyst microparticles of 5 nm or less, especially 1 nm to 5 nm in particle size are present. FIG. 11 shows an example of the measurement of $Pd(Mn_3O_4)$ using the element mapping system attached to the transmission electron microscope. From FIG. 11, it can be seen that the manganese and oxygen are concentrated on the positions of the rods. It can also be seen that the palladium is distributed on the surfaces of the rods.

Figure 12:
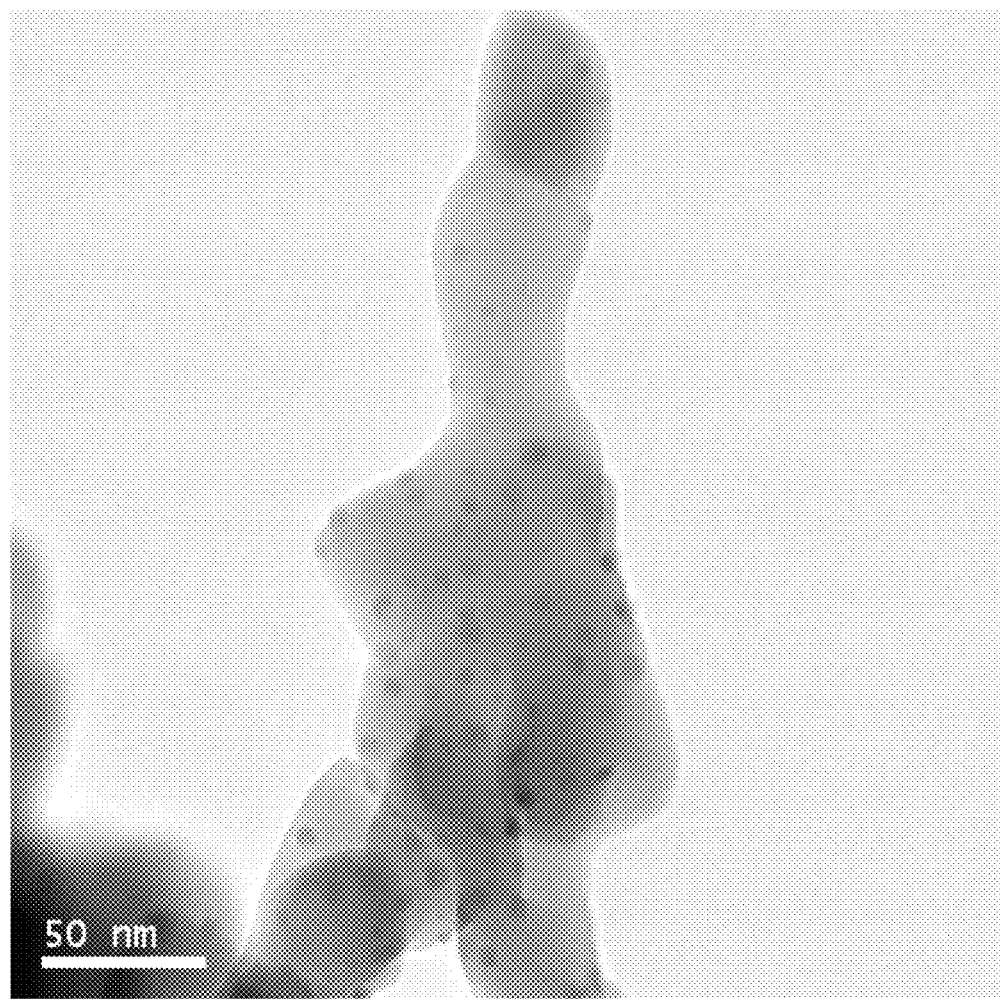
FIG. 12 shows a transmission electron microscopic photograph of a metal manganese PdMn carrying a palladium.
Figure 13:
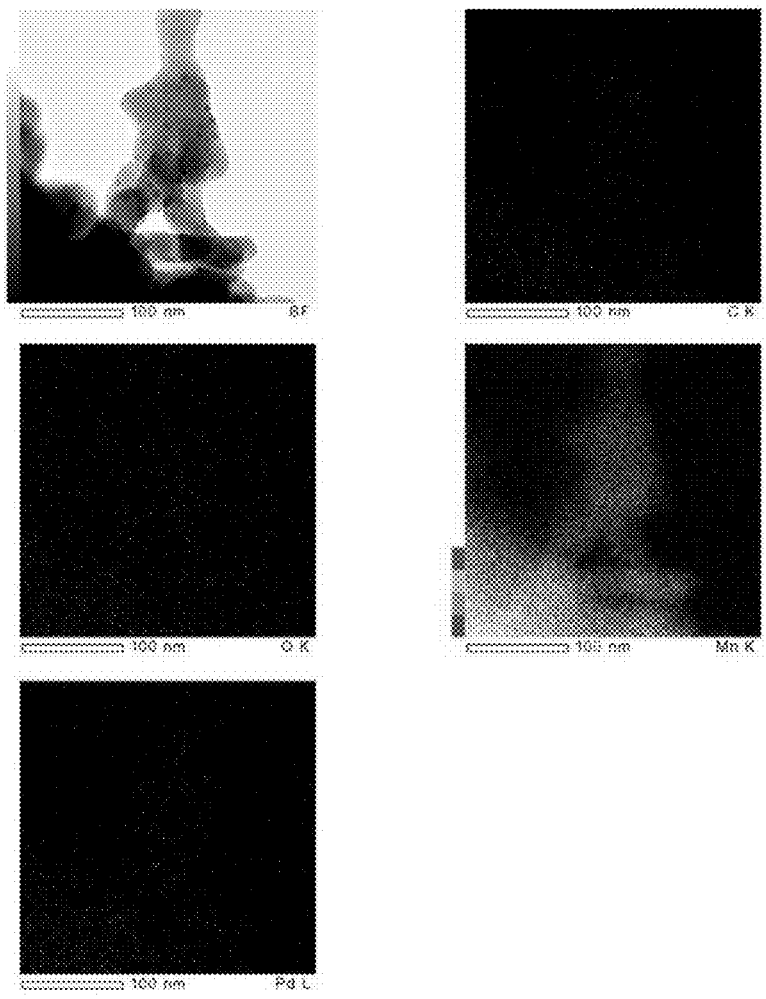
FIG. 13 shows an example of the measurement of PdMn using the element mapping system attached to the transmission electron microscopic photograph.

In the sample observed in FIG. 11, a metal manganese carrying the palladium, PdMn, considered to be generated by the reduction of $Pd(Mn_3O_4)$ was also observed although the amount was substantially small. Its transmission electron microscopic photograph is shown in FIG. 12. A fine Pd particle of 1 nm to 5 nm in particle size is observed on the surface of the Mn metal. The material shown in FIG. 12 was found to be a metal manganese carrying the palladium, PdMn, based on the example of the measurement by the element mapping system attached to the transmission electron microscope shown in FIG. 13. In this mapping, the manganese is distributed correspondingly to the image of the electron microscopic photograph, but almost no oxygen is observed. This may be due to the metallization of the manganese as a result of the contact with the hydrogen gas at 300° C.

As a result of these procedures, it was possible to synthesize the manganese oxide carrying the palladium catalyst metal microparticle $Pd(Mn_3O_4)$.

Example 2

Method for Reforming Methane Gas to Hydrogen Using Methane Gas Reforming Catalyst $Pd(Mn_3O_4)$ 0.2 g of the catalyst whose main ingredient was $Pd(Mn_3O_4)$ described in (1-2) shown above (also containing PdMn) was packed into the Pyrex (trade mark) glass tube of 6 mm in inner diameter in the reaction system shown in FIG. 1. The packed catalyst was provided with a glass wool in its both ends to prevent the catalyst powder from being scattered. In this glass tube, the synthesized material was heated by a heater under the condition described below, and while keeping such a temperature the gas mixture of a methane gas (10% concentration) and an argon gas (90% concentration) was humidified by the passage through a bubbler filled with 30 mL of a distilled water at a flow rate of 20 mL/min using a stainless steel piping and then allowed to pass through and contact with the catalyst in this glass tube. The gas after the passage through and the contact with the catalyst in this glass tube was introduced into a gas chromatograph manufactured by Shimadzu Corporation (GC-RAPT, molecular sieves 54 A, column oven temperature: 60° C.) to quantify the generated hydrogen concentration and the carbon monoxide concentration.

The heating temperature was raised from room temperature to 150° C., which was kept for 3 hours. At this temperature, no hydrogen concentration was detected.

Then, the heating temperature was raised to 300° C., which was kept for 4 hours. At this temperature, a hydrogen concentration of 3.6% was detected constantly in the gas after the passage through and the contact with the catalyst in this glass tube. The carbon monoxide concentration was lower than the detection limit and could not be measured because of almost no generation. Then, the heating temperature was lowered to 200° C., which was kept for 1 hour. Also at this time, a hydrogen concentration of 1200 ppm was detected constantly. The carbon monoxide concentration was lower than the detection limit and could not be measured.

Next, the temperature was lowered once to room temperature and then the heating temperature was raised again to 300° C., and after reaching 300° C. a hydrogen concentration of 2.8% was detected constantly for 1 hour. Also at this time, the carbon monoxide concentration was lower than the detection limit and could not be measured because of almost no generation.

In the experiment described above, the gas mixture of a methane gas (10% concentration) and an argon gas (90% concentration) was humidified by the passage through a bubbler filled with 30 mL of a distilled water at a flow rate of 20 mL/min and then allowed to pass through and contact with the catalyst in this glass tube. Allowing the gas mixture to pass through the bubbler containing the distilled water is effective in reacting the carbon monoxide with the water and the manganese oxide to decompose into a hydrogen ion and an electron. Also when the both of the gas mixture (flow rate: 32 mL/min) of an oxygen gas (20% concentration) and an argon gas (80% concentration) and the gas mixture (flow rate: 8 mL/min) of a methane gas (10% concentration) and an argon gas (90% concentration) were mixed and allowed to pass through the bubbler filled with the distilled water and allowed to pass through and contact with the catalyst in this glass tube at an overall flow rate of 40 mL/min, no hydrogen generation was detected under the 300° C. heating condition. This may be due to an inhibitory effect on the reformation from the methane to the hydrogen as a result of the carbon dioxide generation derived from the carbon originating from the methane due to a promotion of the methane gas combustion by the oxygen serving as a combustion aid. Accordingly, it was found to be important for promoting the reformation from the methane gas into the hydrogen to minimize the migration of the oxygen into the methane gas to be introduced into and brought into contact with the manganese oxide carrying the palladium catalyst microparticle $Pd(Mn_3O_4)$. It should be noted that it was confirmed by the same gas chromatography that when the oxygen was not introduced in an intentional manner as in this experiment the oxygen concentration in the same reaction system was 20 ppm or lower.

The invention claimed is:

1. A method for synthesizing a methane gas reforming catalyst which is a method for synthesizing a catalyst which reforms a methane gas into a hydrogen gas comprising:
   a palladium deposition step in which a manganese dioxide having a ramsdellite-type crystal structure is immersed in a palladium-containing aqueous solution to allow a metallic palladium having a particle size of 10 nm or less to be deposited on a surface of said manganese dioxide in the solution, and
   a heat treatment step in which said manganese dioxide having the metallic palladium deposited thereon is heated under a gas mixture of methane gas and argon gas atmosphere to change said manganese dioxide to a manganese oxide $Mn_3O_4$ having the metallic palladium carried thereon.

2. The method for synthesizing a methane gas reforming catalyst according to claim 1 wherein said heat treatment step involves heating said manganese dioxide having the metallic palladium deposited thereon under the gas mixture atmosphere at a temperature of 150° C. to 700° C.

3. The method for synthesizing a methane gas reforming catalyst according to claim 1 wherein said manganese dioxide having the ramsdellite-type crystal structure employed in said palladium deposition step is obtained by adding to an aqueous solution of a manganese compound comprising a divalent manganese ion, an alkali reagent to precipitate a manganese hydroxide, further adding an aqueous hydrogen peroxide to convert said manganese hydroxide to a manganese oxide, followed by recovering this manganese oxide which is then brought into contact with a dilute acid.

4. The method for synthesizing a methane gas reforming catalyst according to claim 2 wherein said manganese dioxide having the ramsdellite-type crystal structure employed in said palladium deposition step is obtained by adding to an aqueous solution of a manganese compound comprising a divalent manganese ion, an alkali reagent to precipitate a manganese hydroxide, further adding an aqueous hydrogen peroxide to convert said manganese hydroxide to a manganese oxide, followed by recovering this manganese oxide which is then brought into contact with a dilute acid.

* * * * *